2,908,615

METHOD OF PREPARING GELATIN OR GLUE

Havard L. Keil, Clarendon Hills, Ill., assignor to Armour and Company, Chicago, Ill., a corporation of Illinois No Drawing. Application February 24, 1956
Serial No. 567,449

8 Claims. (Cl. 195—6)

This invention relates to a process for preparing gelatin and the like from pork skins. More particularly, the invention relates to an improved method for conditioning pork skins in preparing the same for gelatin or glue extraction and to a method of recovering said substances therefrom.

It will be understood that the invention is applicable to the preparation of either gelatin or glue, depending on the previous treatment to which the pork skins have been subjected. The major difference between gelatin and glue lies in the edibility of the material from which these substances are obtained. Thus, for example, if the previous history of the pork skins used as the starting material has been such that the pork skins are edible, then the end product in the method of the present invention will be edible gelatin; whereas, if the pork skin starting materials have been subjected to non-edible conditions, the end product will be animal glue.

In my co-pending application Serial No. 475,570, filed December 15, 1954, which issued as U.S. Patent 2,741,576, there is described an invention which, in one of its embodiments, involves the treatment of collagen-bearing animal tissue by a method comprising the steps of sterilizing the tissue with hydrogen peroxide, exposing the sterilized tissue to the action of added living yeast-type organisms to partially condition the same, and thereafter liming the tissues to complete the conditioning for subsequent water extraction of glue. The advantages of the process set forth in said application Serial No. 475,570 include a substantial shortening of the conventional liming step and the production of high yields of excellent quality glue from the standpoint of gel strength and viscosity.

It is an object of the present invention to provide an improvement over the method set forth in said application Serial No. 475,570. More particularly, it is an object of the invention to provide a method of completely eliminating the liming step in the preparation of gelatin or glue. It is another object of the invention to provide a short, economical method for obtaining excellent quality glue in high yields. Further objects and advantages will appear as the specification proceeds.

The present invention is based on the discovery that, in the method comprising the steps of sterilizing collagen-bearing animal material, exposing the sterilized material to the action of added living yeast-type organisms to condition the same, liming the conditioned tissues, and then extracting gelatin or glue from said tissues with water, the liming step can be completely omitted if the starting material is pork skins. It has been discovered that the combination of sterilizing and treating with added living yeast-type organisms is so effective in the conditioning of pork skins that gelatin or glue can readily be extracted from the skins immediately following the organism conditioning step without the need for further conditioning with lime.

The process of the present invention therefore comprises the steps of treating pork skins with a sterilizing agent, subjecting the sterilized skins to the action of added living yeast-type organisms to condition the skins, and then extracting gelatin or glue from the conditioned skins with water.

As the starting material for use in the process of this invention, any suitable pork skin material may be employed. The term "pork skins" may include fresh, smoked, or salted skins derived as by-products in meat packing plants. More specifically, the invention comprises the use of products such as fresh pig skins obtained from the pork trimming operations in packing plants or smoked bacon skins which are by-products of the bacon operation. As previously indicated, the edible or inedible character of the pork skin starting material is of signficance in determining whether the end product of the invention will be gelatin or glue.

In practicing the process of this invention, the solid pieces of pork skin are usually washed to remove salt if the material has previously been salted as well as dirt and other foreign matter accumulated thereon in the process of handling prior to its becoming available for use in the present invention.

Next, the skins are sterilized, and for this purpose several different methods of treatment can be used. For example, the washed and drained pork skins can be sterilized by the action of a germicidal agent such as hydrogen peroxide. One advantage of using hydrogen peroxide for this purpose is that it can readily be destroyed with catalase after the pig skins have been sterilized, although in many cases there is sufficient catalase present in the solution of yeast-type organisms added in the subsequent step to remove the added hydrogen peroxide. As a further point in favor of using hydrogen peroxide, the initial use of this sterilizing agent appears to enhance the effectiveness of the succeeding step in conditioning the stock for gelatin or glue extraction. About 1% of a 30% hydrogen peroxide solution added to the water covering the pork skins and allowed to remain in contact therewith for about two to three hours at room temperature or thereabouts is generally sufficient for accomplishing the desired results. If desired, other sterilizing agents such as sodium benzoate or thymol may be used.

Following the sterilization step, the pork skins are then covered with water. About 2 to 4 weights of water are used to cover a given weight of pork skins. After soaking for a few hours, the microorganisms are added directly to the bath, preferably in the form of an aqueous broth in order to achieve more uniform distribution. The inoculum of microorganisms on the basis of the weight of the pork skins can be varied as between 0.5 and 3% by weight. Amounts in excess of 3% can be used, but no significant advantage is obtained thereby other than a slight acceleration of the conditioning step which does not ordinarily warrant the use of additional amounts. It has been found that about 0.8 to 1.5% by weight give very good results and about 1% by weight is preferred. This latter amount calculated on the basis of overall concentration using three weights of water to cover the stock amounts to about 0.25%.

The pretreatment of the pig skins with microorganisms referred to herein is usually completed in two to four days. The time required for completing the conditioning of the glue stock is somewhat dependent upon temperature as well as other factors as the type and amount of inoculum being used. For practical considerations it may be desirable to use room temperature (about 70° F.). The temperature can be raised or lowered, however, within limits readily determinable by those skilled in the art as conducive to maintaining the organisms in living form. By way of illustration, it has been found that the conditioning of pork skins could be accelerated by one to two days by maintaining a vat temperature of 95° F. as opposed to room temperature. It is thus seen that the temperature for the conditioning step is not critical but can be varied in accordance with desired practices.

The conditioning step can be further enhanced, if desired, by the addition of well-known nutrient materials such as glucose, sucrose, lactose, etc., which favor the more rapid growth and thereby promote the action of the microorganisms on the pork skins.

Among the various microorganisms which can be employed for conditioning the stock are the true yeasts of the tribe Saccharomyceteae. The genus Saccharomyces classified thereunder includes most of the commercial yeasts such as baker's yeast, brewer's yeast, etc., which are identified as *S. cerevisiae* and *S. carlsbergensis*. In addition to these two yeasts, various yeast-like organisms such as Mycoderma (sp.) and Torulopsis (sp.) can also be used. The use of these microorganisms in conjunction with an acidified aqueous plumping of the stock for conditioning the material is described in co-pending applications Serial No. 243,378, filed August 23, 1951, which issued as U.S. Patent 2,741,575, and Serial No. 339,166 filed February 26, 1953, which issued as U.S. Patent 2,805,186.

Of the aforementioned yeasts and yeast-like organisms collectively referred to hereinafter as yeast-type organisms which exhibit a favorable hide conditioning action without proteolysis, it is preferred to use the true yeasts of the genus Saccharomyces and the species *cerevisiae* (baker's yeast) is particularly desirable in view of its availability and relatively low cost.

The mechanism of the conditioning reaction is not clearly understood but it has been determined on the basis of conventional tyrosine tests that little or no proteolytic activity is involved. The conditioning is thus seen to be dependent upon the function of living or vegetative microorganisms.

Upon completion of the above conditioning of the pork skins, the aqueous phase containing the microorganisms and other substances removed from the skins is drained off and the stock, after washing, is covered with water. Gelatin or glue liquor is then extracted from the skins by one or more "hot water cooks" at about the boiling point of the water. The extracted gelatin or glue liquor can be further processed to yield the dried product, if desired, by following the well-known procedures of chilling, drying, grinding, etc.

In one embodiment of the invention, where glue is to be obtained as the end product, and where the edibility of the product is therefore of no consequence, the preliminary treatment with hydrogen peroxide or other sterilizing agent may be omitted, and in lieu thereof treatment with a selective bactericide such as a silicofluoride salt can be carried on simultaneously with the microorganism conditioning step. In the practice of this embodiment of the invention, it is preferred first to wash the solid pieces of pork skins and then cover the washed skins with water containing the added living yeast-type organisms for a period of hours, after which the selective bactericide is added to the mixture, so that the pork skins are then kept in contact with both the microorganisms and the selective bactericide during the remaining period of the treatment.

By "selective bactericide" is meant the property of the reagent to destroy putrefaction-causing organisms without impairing the activity of the living yeast-type organisms used for conditioning the stock. Among the various silicofluoride salts which can be used simultaneously with the microorganism treatment of the pork skins without destroying the yeast and/or yeast-like organisms are the sodium, potassium and ammonium compounds. The alkali metal salts are preferred and sodium silicofluoride is particularly desirable. From 0.5 to 3% by weight is generally sufficient to prevent spoilage of the pork skins and permit the conditioning to proceed as desired. Excellent results are achieved with the use of about 1% by weight of sodium silicofluoride on the basis of the weight of glue stock. In terms of overall concentration, when three weights of water are used, this 1% concentration is reduced to about 0.25% by weight.

The invention is further illustrated by the following specific examples:

EXAMPLE 1

To 100 pounds of bacon skins in an iron or stainless steel container was added sufficient warm water (95° F.) to cover the stock. 1% of a 30% solution of hydrogen peroxide was stirred into the batch, holding the temperature at 95° F. After standing for 2 hours, one pound of baker's yeast (National brand) and 5 pounds of glucose was added, and the lot was stirred well by hand to distribute these substances. The mixture was allowed to stand warm (95° F.) for about 16 hours with an occasional stirring by hand. The evolution of considerable gas and the development of a characteristic fermentation odor was noticed after about 2 hours from the time the yeast was added. A bottom outlet in the treating vessel was opened and the skins were drained free of the fermentation liquor. They were then rinsed once with warm water. This concluded the conditioning step.

The stock was covered with water, and the temperature raised to boiling. After boiling in the open container for 4 hours, the protein containing liquor was removed and another lot of water was added to the skins. Boiling was repeated for 4 hours. The liquid was then removed, and the solid residue diverted to inedible by-product disposal.

Both lots of protein-liquors were strained through cloth on wire screens to remove suspended solids. It was found that the liquors could be strained more rapidly if they were hot during this operation. Fat separated readily from the hot liquors and could be pumped from the surface to leave a substantially fat-free liquid. Total solids of the liquors were about 15%, and the pH was 6.8. By simply boiling off water, it was possible to concentrate up to about 45% total solids. This concentrate could be gelled and dried in the usual manner. The data with respect to the final glue product is set forth in Table I below:

Table I

|  | Glue, percent | Jell, Gms. | Jell (Ass'n) | Vis., Mp. | Vis. (Ass'n) | pH | Wt. Glue in Gms. |
|---|---|---|---|---|---|---|---|
| First cook | 42.4 | 372 | 14.3 | 172 | 19.4 | 6.7 | 167 |
| Second cook | 57.6 | 371 | 14.3 | 137 | 17.0 | 6.8 | 227 |

Yield=30%.
Average jell=373.
Average viscosity=152.

The excellent quality of the glue produced as above is indicated by the following consideration: The balanced viscosity for a glue having a jell of 373 is one-third of 373, or 124. Therefore, the present product, with a viscosity of 152, has a value 140% of the minimum for a good grade of glue.

EXAMPLE 2

A 100 pound batch of bacon skins was treated according to the method of Example 1. The results are set forth in Table II below:

Table II

|  | Glue, percent | Jell, Gms. | Jell (Ass'n) | Vis., Mp. | Vis. (Ass'n) | pH | Wt. Glue in Gms. |
|---|---|---|---|---|---|---|---|
| First cook | 46.5 | 285 | 11.5 | 132 | 16.6 | 7.0 | 220 |
| Second cook | 53.5 | 285 | 11.5 | 107 | 14.5 | 7.0 | 252 |

Yield=26%.
Average jell=227.
Average viscosity=118.

The balanced viscosity for a glue having a jell of 227 is one-third of 227, or 79. Therefore, the present product, with its viscosity of 118, has a value 149% of the minimum for a good grade of glue.

EXAMPLE 3

A 100 pound batch of bacon skins was treated according to the method of Example 1. The results are set forth in Table III below:

Table III

|  | Gelatin, percent | Jell, Gms. | Jell (Ass'n) | Vis., Mp. | Vis. (Ass'n) | pH | Weight Gelatin in Gms. |
|---|---|---|---|---|---|---|---|
| First cook | 42.5 | 421 | 15.8 | 146 | 17.6 | 6.0 | 247 |
| Second cook | 57.5 | 364 | 14.0 | 121 | 15.7 | 6.1 | 333 |

Yield=32%.
Average jell=385.
Average viscosity=131.

While in the foregoing specification this invention has been described in considerable detail and a number of specific embodiments have been set forth, it will be apparent to those skilled in the art that many of the specific details and embodiments can be varied widely without departing from the broad spirit of the invention.

I claim:

1. The method of extracting a material selected from the group consisting of gelatin and glue from pork skins which comprises treating the skins with a sterilizing agent, subjecting the sterilized skins to the action of added living yeast-type organisms to condition said skins, and then extracting a material selected from the group consisting of gelatin and glue from the conditioned skins with water.

2. The method of claim 1 wherein the organisms are of the genus Saccharomyces.

3. The method of claim 1 wherein the sterilizing agent is hydrogen peroxide.

4. The method of claim 1 wherein the pork skins are smoked bacon skins.

5. The method of claim 1 wherein the pork skins are fresh pig skins.

6. The method of extracting a material selected from the group consisting of gelatin and glue from pork skins which comprises sterilizing the skins with hydrogen peroxide, subjecting the sterilized skins to the action of an aqueous mixture containing about 1% by weight of baker's yeast to condition the skins, removing said aqueous mixture, covering the conditioned skins with hot water, and boiling the mixture to extract a material selected from the group consisting of gelatin and glue from said skins.

7. The method of extracting a material selected from the group consisting of gelatin and glue from pork skins which comprises the steps of exposing the pork skins to the action of an aqueous bath containing living yeast-type organisms and a selective bactericide to condition the same, and thereafter extracting a material selected from the group consisting of gelatin and glue from the conditioned skins with water.

8. The process of claim 7 wherein said bactericide is an alkali metal silicofluoride salt.

References Cited in the file of this patent

UNITED STATES PATENTS

| 798,298 | Oakes | Aug. 29, 1905 |
| 1,210,968 | Nasse et al. | Jan. 2, 1917 |
| 2,741,575 | Keil et al. | Apr. 10, 1956 |
| 2,805,186 | Keil et al. | Sept. 3, 1957 |